(12) United States Patent
Wong et al.

(10) Patent No.: US 11,763,306 B2
(45) Date of Patent: Sep. 19, 2023

(54) SYSTEMS AND METHODS FOR AUTHENTICATING USERS

(71) Applicant: MASTERCARD INTERNATIONAL INCORPORATED, Purchase, NY (US)

(72) Inventors: Bernard Wong, Markham (CA); Ellen Moskowitz, Port Chester, NY (US); Emily Anne Stepper, Nyack, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 144 days.

(21) Appl. No.: 17/008,170

(22) Filed: Aug. 31, 2020

(65) Prior Publication Data
US 2022/0067743 A1     Mar. 3, 2022

(51) Int. Cl.
*G06K 5/00* (2006.01)
*G06Q 20/40* (2012.01)
(Continued)

(52) U.S. Cl.
CPC ..... *G06Q 20/40145* (2013.01); *G06K 19/041* (2013.01); *G06Q 20/02* (2013.01); *G06Q 20/0855* (2013.01); *G06Q 20/202* (2013.01); *G06Q 20/204* (2013.01); *G06Q 20/325* (2013.01); *G06Q 20/3415* (2013.01); *G06Q 20/357* (2013.01); *G06Q 30/0185* (2013.01);
(Continued)

(58) Field of Classification Search
CPC ............. G06Q 20/40145; G06Q 20/02; G06Q 20/0855; G06Q 20/202; G06Q 20/204; G06Q 20/325; G06Q 20/3415; G06Q 20/357; G06Q 30/0185; G06Q 30/0609; G06Q 2220/00; G06K 19/041; H04L 63/0853; H04L 63/0861
See application file for complete search history.

(56) References Cited

U.S. PATENT DOCUMENTS 10,037,528 B2 * 7/2018 Gardiner ............ G06V 40/1365
2007/0067642 A1   3/2007 Singhal
(Continued)

OTHER PUBLICATIONS

U.S. Appl. No. 17/008,092, filed Aug. 31, 2020, Wong et al.

*Primary Examiner* — Talia F Crawley
(74) *Attorney, Agent, or Firm* — Harness, Dickey & Pierce, P.L.C.

(57) ABSTRACT

Systems and methods for verifying users in connection with transactions using biometric payment card devices are disclosed. One exemplary biometric payment card device generally includes a card body, a fingerprint sensor, a modem, and a processor coupled to the modem and the fingerprint sensor, where each of the fingerprint sensor, the modem, and the processor are disposed on the card body. The processor of the payment card device is configured to capture, via the fingerprint sensor, a fingerprint of a user associated with the payment account, compare the captured fingerprint to a reference fingerprint stored in memory in communication with the processor, and then compile and transmit, by the modem, an authentication result to an issuer of the payment account and/or a payment network associated with the payment account in response to the user being authenticated, or not, based on the comparison of the captured fingerprint and the reference fingerprint.

19 Claims, 5 Drawing Sheets

(51) Int. Cl.
*G06K 9/00* (2022.01)
*G06Q 20/34* (2012.01)
*H04L 29/06* (2006.01)
*H04L 9/40* (2022.01)
*G06Q 20/20* (2012.01)
*G06Q 20/32* (2012.01)
*G06Q 20/08* (2012.01)
*G06Q 30/018* (2023.01)
*G06Q 30/0601* (2023.01)
*G06K 19/04* (2006.01)
*G06Q 20/02* (2012.01)

(52) U.S. Cl.
CPC ..... *G06Q 30/0609* (2013.01); *H04L 63/0853* (2013.01); *H04L 63/0861* (2013.01); *G06Q 2220/00* (2013.01)

(56) References Cited

U.S. PATENT DOCUMENTS

| | | |
|---|---|---|
| 2009/0145972 A1* | 6/2009 | Evans .............. G06Q 20/40145 |
| | | 235/492 |
| 2009/0150294 A1 | 6/2009 | March et al. |
| 2009/0270127 A1 | 10/2009 | Kakimoto |
| 2010/0006641 A1 | 1/2010 | Boutcher et al. |
| 2016/0364718 A1 | 12/2016 | Betancourt et al. |
| 2017/0004486 A1 | 1/2017 | Dhala et al. |
| 2018/0234535 A1 | 8/2018 | Chang et al. |
| 2019/0080330 A1 | 3/2019 | Schipperheijn |
| 2020/0111094 A1 | 4/2020 | Maheshwari et al. |
| 2020/0175495 A1 | 6/2020 | Omojola et al. |
| 2021/0248856 A1 | 8/2021 | Mehrhoff et al. |
| 2021/0342815 A1 | 11/2021 | Gupta |
| 2022/0067699 A1 | 3/2022 | Wong et al. |
| 2022/0067743 A1* | 3/2022 | Wong .................. G06Q 20/325 |

* cited by examiner

SYSTEMS AND METHODS FOR AUTHENTICATING USERS

FIELD

The present disclosure generally relates to systems and methods for use in user authentication, and more specifically, to systems and methods for use in authenticating users in connection with network-based interactions involving the users.

BACKGROUND

This section provides background information related to the present disclosure which is not necessarily prior art.

Users are known to interact with a variety of different entities for a variety of different purposes including, for example, purposes related to commerce. When a user interacts with a merchant, to make a purchase, the user may present a credit card to the merchant to fund the purchase. The merchant, in turn, may authenticate the user through a signature, or may permit the user to provide a PIN, biometric, etc., whereby the user is authenticated either by the merchant or by an issuer of the user's credit card (via the signature, PIN, or biometric). In this manner, the merchant and the user cooperate to limit transactions funded by the credit card to only the user(s) authorized to transact with the credit card.

DRAWINGS

The drawings described herein are for illustrative purposes only of selected embodiments and not all possible implementations, and are not intended to limit the scope of the present disclosure.

Figure 1:
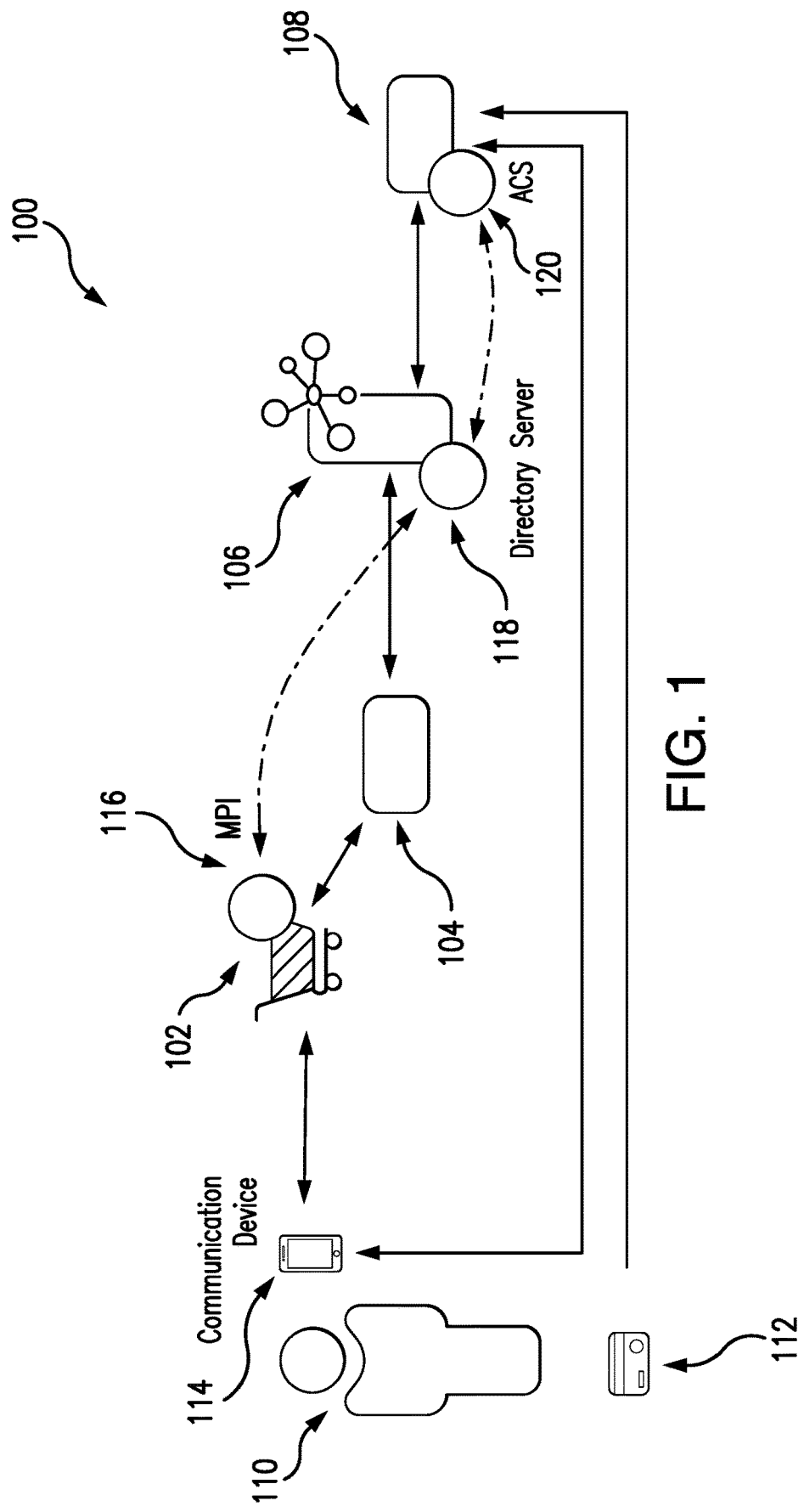
FIG. 1 illustrates an exemplary system of the present disclosure suitable for use in authenticating a user, via a biometric payment card device associated with the user, in connection with network-based transactions involving the user.
Figure 4:
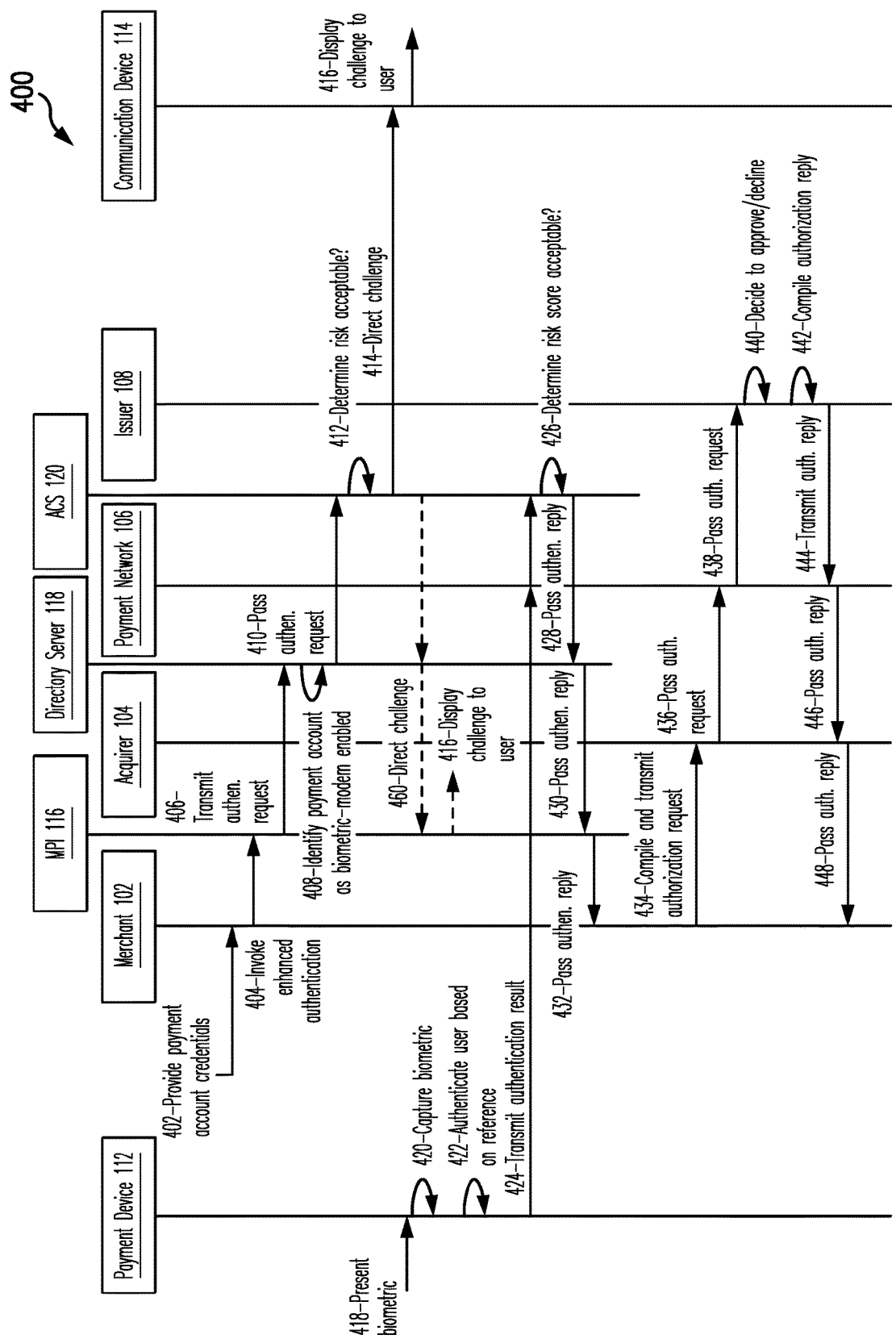
Figure 5:
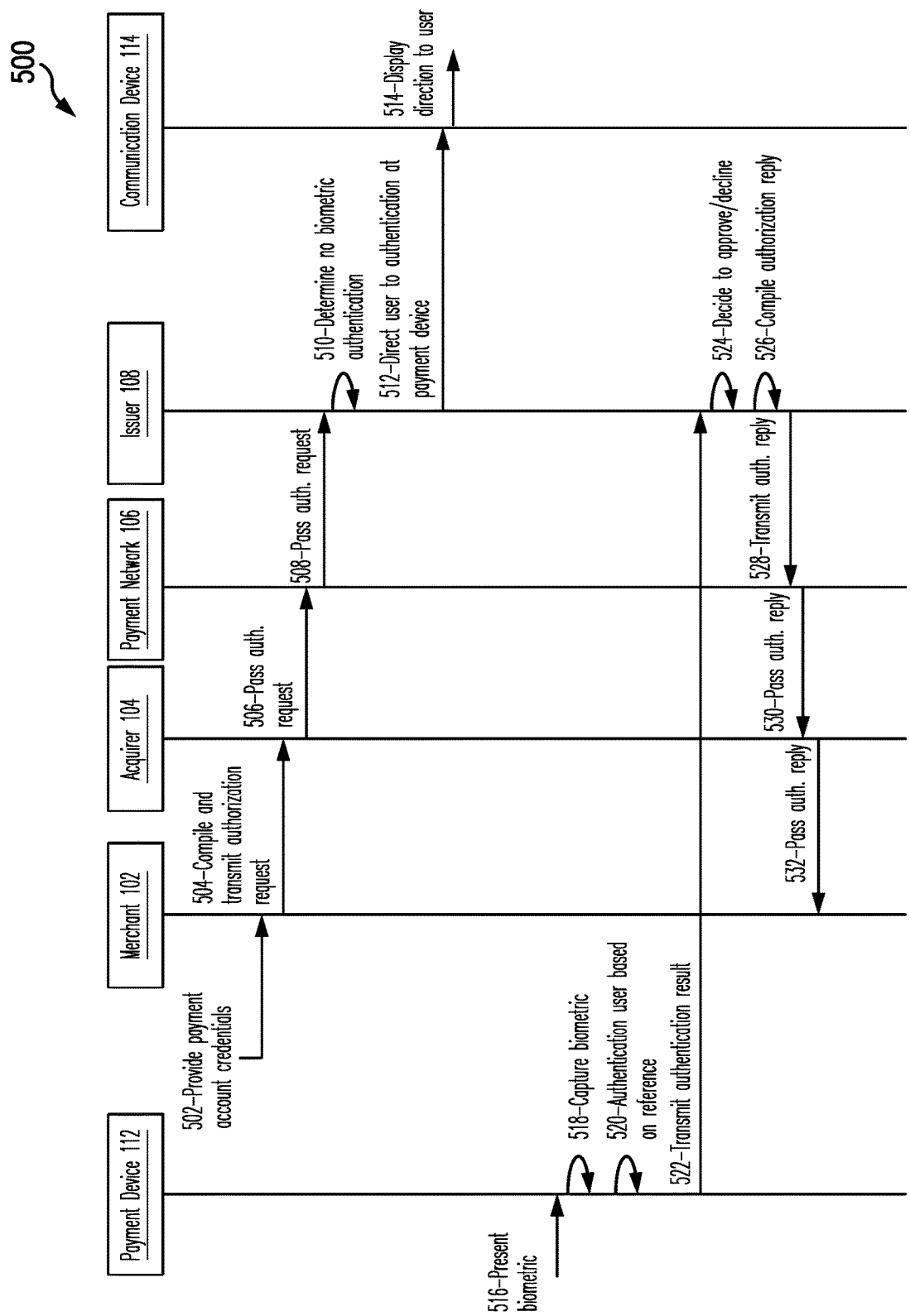

FIG. 4 is an exemplary method, suitable for use with the system of FIG. 1, for authenticating the user directly at the biometric payment card device in connection with a network-based transaction by the user, whereby an authentication result is provided to a payment network or issuer associated with the biometric payment card device; and FIG. 5 is another exemplary method, suitable for use with the system of FIG. 1, for authenticating the user at the biometric payment card device in connection with a network-based transaction by the user.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Authenticating users to payment accounts is important to ensure that only users authorized to use the payment account are permitted to, in fact, use the payment accounts. Certain types of transactions hinder the authenticating of users, including, for example, e-commerce or network-based transactions, where users are not physically present at merchant locations when performing the transactions. Uniquely, the systems and methods herein provide biometric payment devices that include modems (e.g., cellular or mobile network modems, wireless enabled modems (e.g., Wi-Fi enabled, etc.), combinations thereof, etc.), whereby the payment devices are enabled to provide authentication results of users associated with the devices, wirelessly, to entities responsible for authenticating the users in connection with transactions. In particular, an exemplary biometric payment device may include a modem enabled for cellular communication, whereby the payment device may then be configured to report authentication of a user associated therewith (in connection with using the payment device in a network-based transaction) via a biometric sensor of the payment device. In this manner, despite the payment device not being presented at a merchant during the transaction (e.g., as in a card-not-present transaction, etc.), the biometric authentication of the user is still permitted (prior to or during authorization, etc.) whereby an issuer of the payment account may rely on this authentication in approving or declining the transaction.

FIG. 1 illustrates an exemplary system 100 in which one or more aspects of the present disclosure may be implemented. Although parts of the system 100 are presented in one arrangement, it should be appreciated that other exemplary embodiments may include the same or different parts arranged otherwise depending on, for example, processes involved in authenticating users in the system embodiment, types of modems included in payment devices, types of telecommunication networks involved in the system embodiment, types of transactions performed by the users in the system embodiment, etc.

As shown in FIG. 1, the illustrated system 100 generally includes a merchant 102, an acquirer 104 associated with the merchant 102, a payment network 106, and an issuer 108 of payment accounts, each coupled to (and each in communication with) one or more networks, as indicted by the arrowed lines. Each of the one or more networks may include, without limitation, a wired and/or wireless network, a local area network (LAN), a wide area network (WAN) (e.g., the Internet, etc.), a mobile network, and/or another suitable public and/or private network capable of supporting communication among two or more of the illustrated components of the system 100, or any combination thereof. One or more of the networks may further be segregated or separated, whereby, for example, the segregated or separated network(s) may include a private payment transaction network provided by the payment network 106 to the acquirer 104 and the issuer 108, and separately, a public network (e.g., the Internet, etc.) through which the merchant 102 and/or a user 110 (via a communication device 114 associated with the user 110) communicate, or through which merchant 102 communicates with the acquirer 104, the payment network 106, and/or the issuer 108.

In this exemplary embodiment, the merchant 102 is, at least in part, a virtual merchant, whereby the merchant 102 is accessible to the user 110 through a virtual merchant location, such as, for example, a website or network-based application. In particular in this embodiment, the user 110 interacts with the virtual merchant location via the communication device 114 (e.g., through a web browser accessible at the communication device 114, through an application installed at the communication device 114, etc.). In connection therewith, the user 110 is permitted to initiate purchase transactions (broadly, network-based transactions), funded by a payment account (as issued to the user 110 by the issuer 108), for goods and/or services offered for sale by the merchant 102 (whereby the user 110 is not present at a physical brick-and-mortar location of the merchant 102 when performing the transaction).

The acquirer 104 in the system 100 includes a banking institution or other financial institution, which has issued an account to the merchant 102, whereby funds associated with payment account transactions to the merchant 102 are delivered. The payment account may include, for example, a credit account, a debit account, or a prepaid account, etc.

In a similar manner, the issuer 108 includes a banking institution or other financial institution, which has issued the payment account to the user 110, and through which the user 110 is permitted to fund transactions with the merchant 102 and other merchants. When the payment account is issued to the user 110, by the issuer 108, the issuer 108 also provides a biometric payment device 112 (in this example) to the user 110 whereby the user 110 can use the payment device 112 to initiate transactions to the user's payment account. The payment device 112 includes, in general, a biometric payment card (e.g., a credit card, a debit card, a pre-paid card, or other card device, etc.), which complies with, in this embodiment, the ISO/IEC 7810 ID-1 standard, which generally indicates the particular physical dimensions and/or dimensional proportions of the payment device 112 (i.e., the biometric payment card in this instance). In addition, the payment device 112 includes a security chip (e.g., EMV chip, etc.) and a biometric sensor (as will be described in more detail hereinafter). Of course, however, other payment device embodiments may be constructed according to one or more different standards. That said, the payment device 112 will be described in more detail hereinafter with reference to FIG. 3.

The payment network 106 is disposed generally between the acquirer 104 and the issuer 108 (and other financial institutions) and is configured to facilitate communication between the acquirer 104 and the issuer 108 to permit the above network-based transaction between the user 110 and the merchant 102 to be authorized. The above-noted transaction (as well as other transactions in the system 100) is facilitated through an authorization request, generated by the merchant 102 and communicated through the payment network 106, as described below, where the authorization request generally abides by the ISO 8583 standard. Once the transaction is authorized, the payment network 106 is further configured to clear and settle the transaction, if approved (e.g., by the issuer 108, etc.), whereby funds are transferred to and from the acquirer 104 (on behalf of the merchant 102, for example) and the issuer 108 (on behalf of the user 110, for example) (along with other approved transactions in general facilitated through the payment network 106).

In addition, in this exemplary embodiment, the payment network 106 is further configured to enable enhanced authentication of users in connection with e-commerce or online transactions performed by the users (including the user 110) at the merchant 102 (e.g., as performed at virtual locations associated with the merchant 102, etc.). This enhanced authentication may include, for example, SecureCode® authentication by Mastercard® (also known as the identity check program, etc.). As part thereof, the system 100 further includes a merchant plug-in (MPI) 116 included at and/or associated with the merchant 102, a directory server 118 included at the payment network 106, and an access control server (ACS) 120 included in and/or associated with the issuer 108, where each of the MPI 116, the directory server 118, and the ACS 120 is coupled in communication through one or more of the networks in the system 100, as again indicated by the arrowed lines. Enhanced authentication in the system 100 is described in more detail below. While the MPI 116, the directory server 118, and the ACS 120 are included in the exemplary system 100, it should be understood that the enhanced authentication provided thereby may be omitted in other embodiments (e.g., where authentication of the user 110, via the payment device 112, is provided in connection with authorization of a transaction, etc.).

With continued reference to FIG. 1, the user 110 is associated with the communication device 114. In addition to supporting conventional use (e.g., whereby the communication device 114 is configured to facilitate phone calls, send and receive short message service (SMS) messages, etc. as is generally understood by those skilled in the art, etc.), the communication device 114 is further configured to access and allow the user 110 to send and/or receive messaging to and/or from the issuer 108 (via one or more networks, etc.), and to communicate with a virtual merchant location of the merchant 102 (again via one or more networks, etc.). In connection therewith, the communication device 114 may include, for example, a network-based application (not shown) associated with and/or provided by the merchant 102 and a separate network-based application associated with and/or provided by the issuer 108, either (or both) of which configures the communication device 114 to operate as described herein (and which allows such communication with the issuer 108 and merchant 102). It should further be appreciated that the communication device 114 may communicate through one or more networks, including, for example, cellular or mobile networks, private wireless networks, etc. That said, the communication device 114 may include, for example, a smartphone, a tablet, a laptop, or another portable computing device (or other computing device in general), etc.

While only one merchant 102 and one user 110 (and one payment device 112 and one communication device 114) are illustrated in FIG. 1, it should be appreciated that any number of merchants and/or users, as described herein, may be included in other embodiments. Likewise, a different number of MPIs, acquirers, payment networks, directory servers, issuers, and ACSs may be included in other system embodiments. In still other embodiments, different merchants may have different acquirers, and different users may employ payment accounts issued by multiple different issuers.

Figure 2:
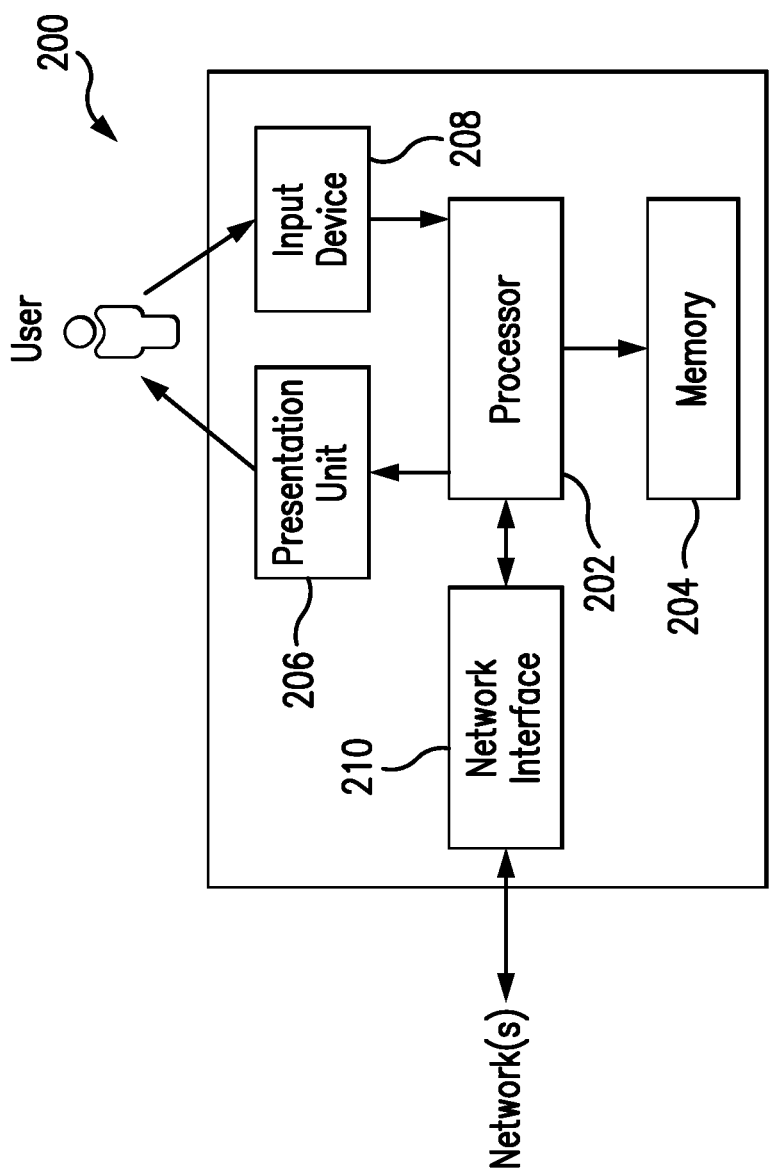
FIG. 2 is a block diagram of an exemplary computing device that may be used in the system of FIG. 1.

FIG. 2 illustrates an exemplary computing device 200 that can be used in the system 100. The computing device 200 may include, for example, one or more servers, workstations, personal computers, laptops, tablets, smartphones, point-of-sale (POS) terminals, payment devices, etc. In addition, the computing device 200 may include a single computing device, or it may include multiple computing devices located in proximity or distributed over a geographic region, so long as the computing devices are specifically configured to function as described herein. In particular, in the exemplary system 100 of FIG. 1, each of the merchant 102, the MPI 116, the acquirer 104, the payment network 106, the directory server 118, the issuer 108, and/or the ACS 120 may include, or may be implemented in, a computing device, such as the computing device 200. In addition, the payment device 112 and the communication device 114 associated with the user 110 may each be considered a computing device consistent with the computing device 200. That said, the system 100 should not be considered to be limited to the computing device 200, as described below, as different computing devices and/or arrangements of computing devices may be used. In addition, different components and/or arrangements of components may be used in other computing devices.

With reference now to FIG. 2, the computing device 200 generally includes a processor 202, and a memory 204 that is coupled to (and in communication with) the processor 202. The processor 202 may include, without limitation, one or more processing units (e.g., in a multi-core configuration, etc.), including a general purpose central processing unit (CPU), a microcontroller, a reduced instruction set computer (RISC) processor, an application specific integrated circuit (ASIC), a programmable logic device (PLD), a gate array, and/or any other circuit or processor capable of the functions described herein. The above examples are exemplary only, and are not intended to limit in any way the definition and/or meaning of processor.

The memory 204, as described herein, is one or more devices that enable information, such as executable instructions and/or other data, to be stored and retrieved. The memory 204 may be configured to store, without limitation, transaction data, primary account numbers (e.g., PANs, etc.), reference biometrics, authentication results, authentication messages, authorization messages, and/or other types of data suitable for use as described herein, etc. In addition, the memory 204 may include one or more computer-readable storage media, such as, without limitation, dynamic random access memory (DRAM), static random access memory (SRAM), read only memory (ROM), erasable programmable read only memory (EPROM), solid state devices (e.g., EMV chips, etc.), CD-ROMs, thumb drives, tapes, flash drives, hard disks, and/or any other type of volatile or nonvolatile physical or tangible computer-readable media. It should be appreciated that the memory 204 may include a variety of different memories. In various embodiments, computer-executable instructions may be stored in the memory 204 for execution by the processor 202 to cause the processor 202 to perform one or more of the operations described herein (e.g., one or more of the operations recited in method 400, one or more of the operations recited in method 500, etc.), such that the memory 204 is a physical, tangible, and non-transitory computer-readable media and such that the instructions stored in the memory 204 enable the computing device to operate as (or transform the computing device into) a specific-purpose device configured to then effect the features described herein.

The computing device 200 also includes a presentation unit 206 and an input device 208 coupled to (and in communication with) the processor 202.

The presentation unit 206 outputs information and/or data to a user (e.g., the user 110, other users, etc.) by, for example, displaying, audibilizing, and/or otherwise outputting the information and/or data. In some embodiments, the presentation unit 206 may comprise a display device such that various interfaces (e.g., application screens, webpages, SMS messages, etc.) may be displayed at computing device 200, at the display device, to display such information and/or data, etc. With that said, the presentation unit 206 may include, without limitation, a cathode ray tube (CRT), a liquid crystal display (LCD), a light-emitting diode (LED) display, an organic LED (OLED) display, an "electronic ink" display, speakers, combinations thereof, etc. In addition, the presentation unit 206 may include multiple devices in some embodiments.

The input device 208, when present in the computing device 200, is configured to receive input from the user 110, for example. The input device may include, without limitation, a keyboard, a mouse, a touch sensitive panel (e.g., a touch pad or a touch screen, etc.), another computing device, and/or an audio input device. Further, in some exemplary embodiments, a touch screen, such as that included in a tablet, a smartphone, or similar device, may function as both the presentation unit 206 and the input device 208.

The illustrated computing device 200 further includes a network interface 210 coupled to (and in communication with) the processor 202 and the memory 204. The network interface 210 may include, without limitation, a wired network adapter, a wireless network adapter, a mobile adapter, or other device capable of communicating to one or more different networks (e.g., the Internet, a private or public LAN, WAN, mobile network, combinations thereof, or other suitable networks, etc.). In some exemplary embodiments, the processor 202 and one or more network interfaces may be incorporated together. In this manner, and others, network interface 210 may be generally consistent with the modem 306 illustrated in the biometric payment device 112 of FIG. 3.

Figure 3:
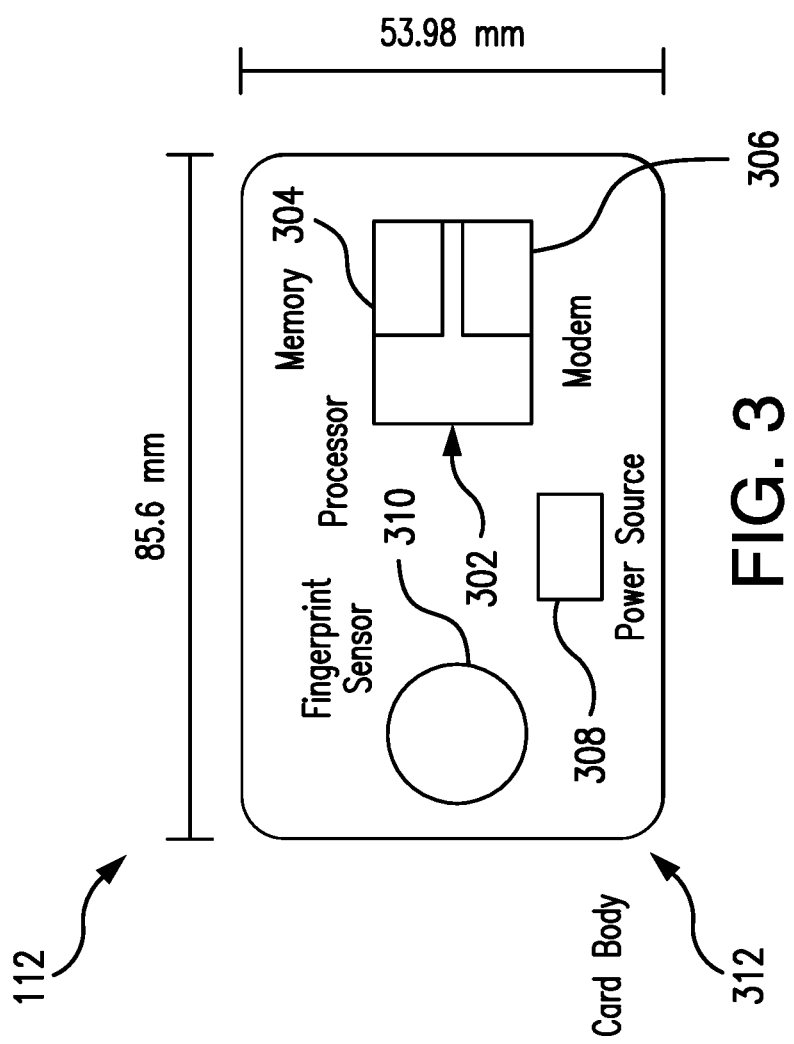
FIG. 3 is a block diagram of an exemplary biometric payment card device including a modem for communicating through a mobile network, where the biometric payment card device may be used in the system of FIG. 1 in connection with a network-based transaction involving the user.

Referring now to FIG. 3, the illustrated biometric payment device 112 is a card device that includes a processor 302, which may include a contact and/or contactless chip (e.g., a security chip such as an EMV chip, etc.) and, as illustrated, incorporates a memory 304 and a modem 306. While a single processor 302 is provided in the biometric payment device 112, it should be appreciated that multiple such processors (or other chips) may be included in other payment device embodiments. What's more, in various embodiments, the memory 304 and the modem 306 associated with the processor 302 are often formed integrally, for manufacturability and size constraints associated with the biometric payment device 112. It should further be appreciated that the memory 304 may include one or more suitable processing units, such as described above (with reference to the processor 202), and the modem 306 may include any suitable device(s), such as described above, each enabling the functions described herein. With that said, in this embodiment, the processor 302 is configured to perform as described herein such that the operations performed by the biometric payment device 112 will be based on the configuration of the processor 302 to perform those operation, unless explicitly provided otherwise.

In this exemplary embodiment, the modem 306 of the biometric payment device 112 includes a modem configured to wirelessly connect and/or provide communication through one or more telecommunication networks, which may include, for example, cellular networks, wireless networks, etc. In one example, the modem 306 includes a mobile subscriber identity and suitable formatting and/or encryption content to enable communication through a cellular network, as provided by a carrier to which the user 110 subscribes. It should be appreciated that the modem 306 may further be configured to permit wireless connection and/or communication with local wireless networks, depending on the particular embodiment. That said, the telecommunication networks may include cellular networks provided by carriers, such as, for example, Verizon, Sprint, T Mobile, etc., whereby the modem 306 is configured to connect to one or more towers (broadly, intermediary devices) of the cellular network (e.g., within range of the modem 306, etc.), etc. Additionally, the telecommunication networks may include wireless networks facilitated by a number of routers (broadly, intermediary devices) disposed across a geographic region (e.g., a business, campus, city, Postal code, etc.), etc.

The biometric payment device 112 also includes a power source 308 (e.g., a battery, etc.) for providing power to the device 300 (e.g., to the modem 306, etc.). In connection therewith, the modem 306 may include a miniaturized modem powered by the power source 308, and configured to transmit outgoing messages from the device 300. Additionally, the device 300 may also be configured, in some embodiments, to be passively powered by a POS terminal when interacting therewith (as generally known, for example, through use of NFC interactions, etc.). Further, in some embodiments, the modem 306 may be configured to facilitate (e.g., allow, etc.) only outgoing communications from the biometric payment device 112 (e.g., for security purposes, for ease of functionality, etc.). However, in other embodiments, the modem 306 may also be configured to permit wireless connection and/or communication with local wireless networks (e.g., the modem 306 may also receive communications to the payment card device 300 as well as transmit outgoing communications, etc.).

In addition, the biometric payment device 112 includes a fingerprint sensor 310 configured to capture a fingerprint of the user 110 for use in verifying or authenticating the user 110. The fingerprint sensor 310, as shown in FIG. 3, is located on an opposite side (or an opposite end portion) of the payment device 300, from the processor 302. In this manner, in a conventional use of the biometric payment device 112 at a physical location of a merchant, for example, the biometric payment device 112 may be inserted into or tapped on a POS terminal (or other terminal or device reader at the merchant), whereby the POS terminal is able to interface with and/or contact the processor 302, while the fingerprint sensor 310 remains outside the terminal and/or accessible to the user 110.

The biometric payment device 112 further includes a card body 312 (whereby the illustrated payment device 112 may be considered a payment card device), which is comprised of plastic (or other suitable material) of sufficient character to carry the processor 302, the memory 304, the modem 306, the power source 308, and the fingerprint sensor 310 (such that the processor 302, the memory 304, the modem 306, the power source 308, and the fingerprint sensor 310 are generally disposed on the card body 312, and whereby the internal electronic layer associated with such components may be generally flexible in nature to accommodate the plastic construction of the card body 312, etc.). As indicated above, the biometric payment device 112 is provided consistent with the ISO/IEC 7810 ID-1 standard. As such, as shown in FIG. 3, the card body 312 defines a generally rectangular shape that measures about 85.60 mm (about 3.37 inches) long and about 53.98 mm (about 2.13 inches) wide. The card body 312 also has a thickness of about 0.76 mm (about 0.03 inches). It should be appreciated, though, that the size of the card body 312 may vary slightly and/or as permitted by the standard in various embodiments (e.g., plus or minus about 0.10 mm (about 0.004 inches), about 0.25 mm (about 0.01 inches), about 0.5 mm (about 0.02 inches), about 1 mm (0.04 inches), about 2 mm (about 0.08 inches), about 5 mm (about 0.20 inches), about 10 mm (about 0.39 inches), etc.). What's more, other payment device embodiments may be consistent with one or more other applicable standards related to payment devices, whereby the card body 312 may be sized and/or shaped differently. For example, in other embodiments, payment devices may have horizontal or vertical card designs, or differently shaped edges, etc. In addition, in one or more embodiments, payment card devices herein may have (without limitation) dimensions (lengths and/or widths) ranging between about 15 mm (about 0.59 inches) and about 150 mm (about 5.91 inches), and thickness dimensions ranging from about 0.1 mm (about 0.004 inches) to about 1 mm (about 0.04 inches).

Again, it should be appreciated that the systems described herein are not limited to the payment device 112 (as depicted in FIGS. 1 and 3), as different payment devices may be used, and conversely, the payment devices described herein are not limited to the system 100.

With reference again to FIG. 1, when the biometric payment device 112 is issued to the user 110 by the issuer 108, or more generally, in connection therewith, the user 110 registers the biometric payment device 112 to himself/herself biometrically, whereby (in this example) the biometric payment device 112 is configured to capture a biometric from the user 110, via the fingerprint sensor 310, and to store the biometric (or representation thereof) in the memory 304 as a reference biometric digital image for the user 110. Thereafter, the biometric payment device 112 is configured to compare biometrics (e.g., fingerprints, etc.) subsequently captured by the biometric payment device 112 (via the biometric sensor 310), in connection with use of the biometric payment device 112 to perform payment account transactions (and/or, more generally, to confirm an identity of a user of the biometric payment device 112 as described herein), to the reference biometric digital image stored therein. That said, it should be appreciated that when the issuer 108 issues the payment account (and the biometric payment device 112) to the user 110, the user 110 will be subject to one or more know-your-customer (KYC) processes, whereby the issuer 108 acquires certain information about the user 110 and confirms the same (in general with regard to issuing the account, and/or for subsequent use in authenticating the user 110 and/or authorizing transactions to the user's payment account, etc.).

Additionally, in one example embodiment, upon issuance of the biometric payment device 112, the user 110 enrolls in a mobile or cellular service for the payment device 112, whereby, like a conventional smartphone, the biometric payment device 112 is configured and/or enabled to communicate through one or more cellular networks, such as provided by a cellular carrier (e.g., Verizon®, Sprint®, T Mobile®, etc.). The cellular service may be funded by the issuer 108 and/or billed to the payment account of the user 110 as decided by the payment network 106, the issuer 108 and/or the user 110, etc. In this way, the biometric payment device 112 is uniquely connected to the one or more cellular networks whereby the biometric payment device 112 is configured to communicate with other parts of the system 100, and/or other entities not shown in FIG. 1, independent of any interaction or communication with hardware or other devices at a location of a merchant (as conventionally required). The biometric payment device 112 may also be configured and/or enabled, via the modem 306, to communicate through one or more wireless networks, as provided by one or more routers (e.g., via W-Fi, etc.). It should be appreciated that while reference is made to telecommunication networks (e.g., including wireless networks, cellular networks, etc.) herein, such networks will generally include at least one intermediate device to which the modem 306 is configured to communicate. In various embodiments, a card configured to communicate directly with a POS terminal or other entity (i.e., without an intermediary device), in close proximity, via wireless connections/communications, including, specific, Bluetooth™, ZigBee™, and RFID, may be excluded from the scope of the modem 306 described herein (and excluded from the telecommunication networks as used herein).

Then in the system 100, when the user 110 initiates a transaction with the merchant 102, via the virtual merchant location at the communication device 114 (e.g., via a web browser at the communication device 114, etc.) or at another computing device (e.g., via a web browser at the computing device, etc.), the user 110 presents payment information to the merchant 102 (e.g., a PAN for his/her payment account, etc.) in order to fund the transaction. In connection therewith, the user 110 may be registered (and, in particular, the user's payment account) for enhanced authentication (through the issuer 108, for example), or not. When the user 110 is registered, the user is then also offered the opportunity, by the merchant 102 and MPI 116, to proceed with enhanced authentication (via SecureCode®/3D secure).

In a first aspect of the system 100, when the user 110 is registered for enhanced authentication (e.g., the user 110 is registered to SecureCode®, etc.), the merchant 102 (and/or the MPI 116) determines that enhanced authentication is enabled for the user 110 as part of the transaction, for example, based on a range of PANs passed to the MPI 116 by the issuer 108, etc. (whereby the PAN provided by the user 110 in connection with the transaction falls within the range of PANs passed to the MPI 116). Following this determination, the MPI 116 (at the merchant 102) is configured to then solicit identifying information related to the user 110 and/or the payment account and to submit an authentication request to the directory server 118 (via a network communication therebetween). In connection therewith, the authentication request may include an indication that the user 110 is registered for enhanced authentication (although this is not required in all embodiments).

Upon receipt of the authentication request, the directory server 118 (either directly or via communication with the payment network 106 and/or a biometric card server associated therewith) is configured to determine whether the payment device 112 is a biometric payment device or not, based on the payment account with which the payment device 112 is associated (e.g., again based on the PAN for the payment account, etc.). When the directory server 118 (or payment network 106) determines that the payment device 112 is a biometric payment device, the directory server 118 in turn is configured to submit the authentication request to the ACS 120 (with an indication that the payment device 112 is a biometric payment device). Based, in part, on the payment device 112 being a biometric payment device (and, potentially, also in part on the user 110 being registered for enhanced authentication), the ACS 120 is configured to identify the communication device 114 of the user 110 (based on the user's registration for enhanced authentication (e.g., via a profile for the user 110 associated therewith, etc.), etc.) and generate a challenge to the user 110 at the communication device 114 requesting the user 110 to present his/her fingerprint to the biometric payment device 112 (regardless of whether or not the original transaction was initiated at the user's communication device 114). The ACS 120 may transmit the challenge to the communication device 114 via email, SMS text message, etc.

In response to the challenge (as received by the user 110 at the communication device 114), the user 110 presents a finger to the fingerprint sensor 310 of the payment device 112 (as powered by the power source 308). In connection therewith, the biometric payment device 112 is configured to capture the fingerprint, from the user 110, at the fingerprint sensor 310 and to authenticate the user 110 against the reference biometric digital image stored in memory 304. The biometric payment device 112 is then configured to generate and transmit an authentication result, indicating that the user 110 is either authenticated or not authenticated (e.g., a yes/no successful biometric match indicator along with a device ID for the biometric payment device 112 and/or an account identifier for the payment account associated with the biometric payment device 112, etc.), to the directory server 118 (or the payment network 106), via the modem 306 (e.g., via one or more cellular network carriers, via one or more wireless network providers, etc.). And, the directory server 118 (and/or the payment network 106) is configured to identify the ACS 120 for the transaction (e.g., by the device ID for the biometric payment device 112, by the account identifier (e.g., PAN, BIN, etc.) for the user's payment account, etc.) and transmit the authentication result on to the ACS 120. The authentication result, then, is generally linked to the transaction by the ACS 120 (e.g., again by way of the device ID for the biometric payment device 112, by the account identifier for the user's payment account, etc.) so that the ACS 120 is able to apply the authentication result to the transaction.

Upon receipt of the authentication result from the biometric payment device 112 (via the directory server 118 and/or the payment network 106), the ACS 120 is configured to score the transaction, for example, based on the authentication result, details of the transaction, etc. (i.e., generate an authentication score). When the authentication score for the transaction is above (or, more generally, satisfies) a threshold, the ACS 120 is configured to provide a response, to the MPI 116, through the directory server 118, which includes an accountholder authentication value (AAV) indicative of the authentication score and/or authentication of the user 110. It should be appreciated that, in other embodiments, the scoring of the transaction may instead be handled at the directory server 118, rather than the ACS 120 (or in combination with the ACS 120), whereby the authentication result would be transmitted by the biometric payment device 112 to the directory server 118 (via the modem 306, as above), and the directory server 118 (and/or payment network 106) may then be configured to score the transaction, for example, based on the authentication result, details of the transaction, etc. (i.e., generate an authentication score). And, in such embodiments, when the authentication score generated by the directory server 118 for the transaction satisfies a threshold, the directory server 118 (and/or the payment network 106) may be configured to provide a response to the MPI 116 (as well as a separate response to the ACS 120), which includes an AAV indicative of the authentication score and/or authentication of the user 110.

In turn, the MPI 116 is configured to pass the AAV (received as part of the authentication result generated by the ACS 120 (or by the directory server 118)) to the merchant 102. The merchant 102, or the virtual merchant location, then compiles an authorization request for the transaction, which includes the AAV. The merchant 102 is configured to then transmit the authorization request to the acquirer 104. And, the acquirer 104 is configured to transmit the authorization request to the issuer 108, via the payment network 106. In response, the issuer 108 is configured to determine whether to approve the transaction, or not, based at least in part of the AAV included in the authorization request. Following such determination, the issuer 108 is configured to compile an authorization reply, which includes an indication to approve or decline the transaction, and transmit the authorization request back to the merchant, via the payment network 106 and the acquirer 104.

In another aspect of the system 100, in connection with the above transaction, when the user 110 is not registered for enhanced authentication but the issuer 108 associated with the user's payment account still implements enhanced authentication for payment accounts including the user's PAN, the merchant 102 (and/or the MPI 116) is configured to determine that enhanced authentication is enabled for the user 110 as part of the transaction, for example, based on identification of a BIN for the issuer 108, etc. included in the payment account information received from the user 110 for the transaction. Upon such determination, the MPI 116 then is configured to solicit identifying information related to the user 110 and/or the user's payment account and to submit an authentication request to the directory server 118.

Again, in response, the directory server 118 (either directly or via communication with the payment network 106 and/or a biometric card server associated therewith) is configured to determine whether the payment device 112 is a biometric payment device or not, based on the payment account with which the payment device 112 is associated (e.g., based on the PAN for the payment account, etc.). When the directory server 118 (or payment network 106) determines that the payment device 112 is a biometric payment device, the directory server 118 in turn is configured to submit the authentication request to the ACS 120 (with an indication that the payment device 112 is a biometric payment device). Based, in part, on the payment device 112 being a biometric payment device, the ACS 120 is configured to generate a challenge to the user 110, which is passed back to the MPI 116 (by the ACS 120) through the directory server 118. In response to the challenge, the MPI 116 is configured to cause an interface to be displayed (or to pop up) to the user 110 (broadly, the MPI 116 is configured to notify the user), at the device through which the user 110 is performing the transaction (e.g., at the communication device 114, or at another computing device, etc.), which includes a direction to the user 110 to authenticate at the biometric payment device 112, and specifically, at the fingerprint sensor 310 thereof.

Upon receipt of the challenge, the user 110 presents a finger to the fingerprint sensor 310 of the payment device 112 (as powered by the power source 308). In connection therewith, the biometric payment device 112 is configured to capture the fingerprint, from the user 110, at the fingerprint sensor 310 and to authenticate the user 110 against the reference biometric digital image stored in memory 304. The biometric payment device 112 is then configured to generate and transmit an authentication result, indicating that the user 110 is either authenticated or not authenticated (e.g., a yes/no successful biometric match indicator along with a device ID for the biometric payment device 112 and/or an account identifier for the payment account associated with the biometric payment device 112, etc.), to the directory server 118 (or the payment network 106), via the modem 306 (e.g., via one or more cellular network carriers, via one or more wireless network providers, etc.). And, the directory server 118 (and/or the payment network 106) is configured to identify the ACS 120 for the transaction (e.g., by the device ID for the biometric payment device 112, by the account identifier (e.g., PAN, BIN, etc.) for the user's payment account, etc.) and transmit the authentication result on to the ACS 120. The authentication result, then, is generally linked to the transaction by the ACS 120 (e.g., again by way of the device ID for the biometric payment device 112, by the account identifier for the user's payment account, etc.) so that the ACS 120 is able to apply the authentication result to the transaction.

In turn, the ACS 120 is configured to score the transaction, for example, based on the authentication result, details of the transaction, etc. (i.e., generate an authentication score). When the authentication score for the transaction is above (or, more generally, satisfies) a threshold, the ACS 120 is configured to provide a response, to the MPI 116, through the directory server 118, which includes an accountholder authentication value (AAV) indicative of the authentication score and/or authentication of the user 110. It should be appreciated that, in other embodiments, the scoring of the transaction may instead be handled at the directory server 118, rather than the ACS 120 (or in combination with the ACS 120), whereby the authentication result would be transmitted by the biometric payment device 112 to the directory server 118 (via the modem 306, as above), and the directory server 118 (and/or payment network 106) may then be configured to score the transaction, for example, based on the authentication result, details of the transaction, etc. (i.e., generate an authentication score). And, when the authentication score generated by the directory server 118 for the transaction satisfies a threshold, the directory server 118 (and/or the payment network 106) may be configured to provide a response to the MPI 116 (as well as a separate response to the ACS 120), which includes an AAV indicative of the authentication score and/or authentication of the user 110.

The MPI 116, then, is configured to pass the AAV (received as part of the authentication result generated by the ACS 120 (or by the directory server 118)) to the merchant 102. And, the merchant 102, or the virtual merchant location, compiles an authorization request for the transaction, which includes the AAV. The merchant 102 is configured to then transmit the authorization request to the acquirer 104. And, the acquirer 104 is configured to transmit the authorization request to the issuer 108, via the payment network 106. In response, the issuer 108 is configured to determine whether to approve the transaction, or not, based at least in part of the AAV included in the authorization request. Following such determination, the issuer 108 is configured to compile an authorization reply, which includes an indication to approve or decline the transaction, and transmit the authorization request back to the merchant, via the payment network 106 and the acquirer 104.

In a further aspect of the system 100, in connection with the above transaction, when the user 110 is not registered for enhanced authentication and the issuer 108 of the user's payment account does not implement enhanced authentication for all payment accounts, the merchant 102 (and not the MPI 116) is configured to proceed with the transaction in a conventional manner. In particular, the merchant 102 is configured to solicit payment account credentials (e.g., a PAN, etc.) from the user 110 through the virtual merchant location (or potentially at a physical location of the merchant 102 where the user 110 is present but still initiates the transaction through the network-based application and where the fingerprint sensor 310 of the biometric payment device 112 is inaccessible). When the credentials are provided, in connection with the specific purchase, the merchant 102 is configured to compile and transmit an authorization request for the transaction to the acquirer 104. The authorization request will include the payment account credentials received from the user 110, a transaction amount for the transaction, and other details specific to the transaction, the merchant 102, the acquirer 104, etc. The authorization request further includes an indication that a biometric authentication of the user 110 either failed or was not attempted (which may simply mean that the authorization request dos not include a biometric authentication indicator or that a biometric authentication indicator is missing from the authorization request).

In this aspect, when the authorization request is received at the acquirer 104, the acquirer 104 is configured to pass the authorization request to the payment network 106. And, the payment network 106, in turn, is configured to pass the authorization request to the issuer 108 (again, in a conventional manner). In response, the issuer 108 is configured to identify the lack of biometric authentication and the involvement of the biometric/modem enabled payment device 112 (e.g., based on the PAN for the user's payment account, etc.). As such, the issuer 108 is configured to ping the payment network 106 (directly, or via the directory server 118 and/or a biometric card server associated with the payment network 106), which is configured to determine whether the payment device 112 is a biometric payment device or not, for example, based on the payment account with which the payment device 112 is associated (e.g., based on the PAN for the payment account, etc.). When the payment network 106 determines that the payment device 112 is a biometric payment device, the payment network 106 (e.g., the biometric card server associated with the payment network 106, etc.) is configured to push an authentication instruction to the user 110, via an SMS message, or a network enabled application message, at the communication device 114 (based on association of the user's biometric payment device 112 to contact information for the user's communication device 114 in a profile for the user 110, etc.), requesting the user 110 to present his/her fingerprint to the biometric payment device 112. When the instruction is received by the user 110, the user 110 accesses the biometric payment device 112 and applies a finger to the fingerprint sensor 310. The biometric payment device 112 is configured to capture the fingerprint, from the user 110, at the fingerprint sensor 310, and authenticate the user 110 against the reference biometric digital image stored in memory 304 of the biometric payment device 112. The biometric payment device 112 is then configured to generate and transmit an authentication result, again indicating that the user 110 is either authenticated or not authenticated (e.g., a yes/no successful biometric match indicator along with a device ID for the biometric payment device 112 and/or an account identifier for the payment account associated with the biometric payment device 112, etc.), to the payment network 106, via the modem 306. And, the payment network 106 is configured to identify the issuer 108 for the transaction (e.g., by the device ID for the biometric payment device 112, by the account identifier (e.g., PAN, BIN, etc.) for the user's payment account, etc.) and transmit the authentication result on to the issuer 108.

When the authentication result is received at the issuer 108, the issuer 108 is configured to then determine whether to approve or decline the transaction as described above, based, at least, in part on the authentication result provided from the payment device 112.

FIG. 4 illustrates an exemplary method 400 of authenticating a user, in connection with a transaction by the user, for example, at a virtual merchant location of a merchant. The method 400 is described below in connection with the exemplary system 100 and the payment device 112 included therein, and the exemplary computing device 200. However, it should be appreciated that the method 400 is not limited to the system 100, the payment device 112, or the computing device 200, but may be implemented in a variety of different systems and/or payment devices and/or computing devices. Likewise, the systems, the payment devices, and the computing devices described herein should not be understood to be limited to the exemplary method 400, or other methods described herein.

In the method 400, and as previously described, the biometric payment device 112 is registered to the user 110 such that there is a reference biometric (e.g., a reference fingerprint, etc.) stored therein, and the payment device 112 is enrolled with a cellular network carrier, whereby the payment device 112 is enabled to communicate as described herein via the modem 306, through a cellular network and corresponding towers (and, potentially, as well through a wireless network and corresponding routers). In addition, the payment account of the user 110 and/or the payment device 112 associated with the payment account is further enrolled for enhanced authentication with the issuer 108.

With that said, at the outset in method 400, the user 110 selects a product to purchase from a virtual merchant location of the merchant 102 (e.g., from a website, network-based application, etc. for the merchant 102), via a computing device (be it the communication device 114 or another computing device). In connection with checkout, the user 110 is prompted to enter payment account credentials (e.g., the PAN, etc.) from his/her payment device 112, whereby the user 110, at 402, provides the payment account credentials to the merchant 102, via the virtual merchant location at the computing device. In response, the merchant 102 determines that the transaction invokes enhanced authentication, at 404 (e.g., based on the PAN provided by the user 110 falling within a range of PANs passed to the MPI 116 by the issuer 108 for enhanced authentication, based on a BIN for the issuer 108 included in the PAN provided by the user 110, etc.).

In response, the MPI 116 compiles an authentication request for the transaction and, at 406, transmits the authentication request to the directory server 118. Upon receipt, the directory server 118 (either directly or via communication with the payment network 106 and/or a biometric card server associated therewith) determines, at 408, whether the payment device 112 is a modem-enabled biometric payment device or not, based on the payment account with which the payment device 112 is associated (e.g., again based on the PAN for the payment account as included in the authentication request, etc.). When the directory server 118 (or payment network 106) determines that the payment device 112 is a biometric payment device, the directory server 118 in turn passes, at 410, the authentication request to the ACS 120 with an indication that the payment device 112 is a biometric payment device.

In turn, the ACS 120 initially determines a risk score for the transaction and then, at 412, determines if the risk score satisfies a predefined threshold. This risk score may be based on, for example, the transaction data for the transaction (e.g., transaction amount, the merchant 102, the fact that the transaction is a card-not-present transaction (and a lack of biometric authentication of the user 110 for the transaction), etc.), etc. When the risk score satisfies the threshold, subsequent authentication of the user may not be required, and the ACS 120 may simply submit an AAV back to the MPI 116 and merchant. However, in the above example, the ACS 120 determines that a risk score for the transaction (based on the transaction involving a card-not-present transaction) does not satisfy a predefined threshold, and that a biometric challenge is required. In connection therewith, the ACS 120 also determines, from the authentication request, that the payment account associated with the transaction is associated with a biometric-modem enabled payment device 112. As such, at 414, the ACS 120 identifies (e.g., either directly or via a biometric card server associated with the payment network 106, etc.) the communication device 114 of the user 110 (based on the user's registration for enhanced authentication (e.g., via a profile for the user 110 associated therewith, etc.), etc.) and directs a challenge to the user 110 at the communication device 114, for example, through the biometric card server at the payment network 106, etc. In particular, for example, the communication device 114 is associated with the user's payment account (and the biometric payment device 112) and is thereby identifiable by the ACS 120 and/or the payment network 106 (e.g., by the biometric card server associated therewith, etc.). In connection therewith, when the ACS 120 determines that a biometric challenge is required, it may ping the payment network 106 (for contact information for the communication device 114) or it may identify the communication device 114 directly from the account of the user 110 at the issuer 108, and then direct the challenge to the user 110, as an SMS message or a network-based application message, for example. In this example, the challenge will include a direction to the user 110 to authenticate himself/herself at the payment device 112, in order to continue with the transaction.

Upon receipt of the challenge from the ACS 120, the communication device 114 displays, at 416, the challenge to the user 110. In response, the user 110 presents, at 418, a biometric, and in particular in this example, a fingerprint, to the fingerprint sensor 310 of the payment device 112. The payment device 112 then captures, at 420, the fingerprint, via the fingerprint sensor 310, and authenticates the user 110, at 422, based on a comparison of the captured fingerprint to the reference biometric (i.e., the reference fingerprint in this example) stored in the payment device 112 (in the memory 304).

In response, the payment device 112 generates an authentication result indicating either that the user 110 was authenticated (i.e., there is a sufficient match as would be understood by one skilled in the art), or that the user 110 was not authenticated, and transmits, at 424, via the modem 306, the authentication result to the payment network 106 (e.g., the biometric card server associated therewith, etc.), which then passes the result to the ACS 120. Upon receipt of the authentication result, the ACS 120 again determines a risk score for the transaction, with this iteration taking into account the authentication result for the user 110 received from the payment device 112, and determines, at 424, if the risk score satisfies a predefined threshold (e.g., the same threshold used at 410 or a different threshold, etc.). The ACS 120 then compiles an authentication reply, which is passed to the directory server 118, at 428 indicating the result of the comparison (e.g., as part of the AAV, etc.) (e.g., a yes/no successful biometric match indicator along with a device ID for the biometric payment device 112 and/or an account identifier for the payment account associated with the biometric payment device 112, etc.) and an indication of the transaction (e.g., a transaction ID, etc.). The directory server 118 passes, at 430, the authentication reply to the MPI 116, and the MPI 116 then passes the authentication reply to the merchant 102, at 432.

Optionally in the method 400 (as indicated by the dashed lines), when the user 110 is not registered for enhanced authentication but the issuer 108 associated with the user's payment account still implements enhanced authentication for payment accounts including the user's PAN, the merchant 102 may determine (at 404) that enhanced authentication is enabled for the user 110 as part of the transaction, for example, based on a BIN for the issuer 108, etc. being included in the payment account information received from the user 110 for the transaction. The MPI 116 then transmits (at 406) an authentication request for the transaction to the directory server 118 as discussed above. And, the directory server 118 determines (at 408) if the user's payment device 112 is a modem-enabled biometric payment device or not, as also described above, and passes (at 410) the authentication request on to the ACS 120.

Then, in this option, when the ACS 120 determines that a biometric challenge is required (at 412), the ACS 120 generates a challenge to the user 110 and passes, at 460, the challenge to the MPI 116 through the directory server 118. In response to the challenge, the MPI 116 is configured to cause, at 462, an interface to be displayed (or to pop up) to the user 110 (broadly, the MPI 116 is configured to notify the user), at the device through which the user 110 is performing the transaction (e.g., at the communication device 114, or at another computing device, etc.), which includes a direction to the user 110 to authenticate at the biometric payment device 112, and specifically, at the fingerprint sensor 310 thereof. In response, the user 110 presents a biometric to the fingerprint sensor 310 of the payment device 112 (at 418) as described above, and the method 400 proceeds as described.

Next in the method 400, once the user 110 is authenticated, the merchant 102 compiles, at 434, an authorization request for the transaction and transmits the authorization request to the acquirer 104. The authorization request includes at least a portion of the authentication reply received from the ACS 120 (e.g., a transaction ID, an AAV, etc.). The acquirer 104 passes the authorization request to the payment network 106, at 436, which, in turn, passes the authorization request to the issuer 108, at 438. The issuer 108 determines, at 440, whether to approve or decline the transaction based, at least in part, on the portion of the authentication reply included in the authorization request (e.g., confirmation of the AAV with the ACS 120, etc.) and one or more other criteria known to the issuer 108, etc. It should be appreciated that the approval or decline may be further based on other aspects of the payment account and/or the underlying transaction (e.g., a fraud score, an account balance, an amount of the transaction, etc.). In turn, the issuer 108 compiles an authorization reply, at 442, and transmits the authorization reply to the payment network 106, at 444. The payment network 106 then passes the authorization reply to the acquirer 104, at 446, which passes the authorization reply to the merchant, at 448. When the transaction is approved, the merchant 102 proceeds to deliver the product or service purchased by the user 110 to the user 110. If, however, the transaction is declined, the merchant 102, for example, may seek alternate forms of funding for the transaction or terminate the transaction.

FIG. 5 illustrates another exemplary method 500 of authenticating a user, in connection with a transaction by the user 110, for example, at a virtual merchant location of a merchant. The method 500 is described below in connection with the exemplary system 100 and the payment device 112 included therein, and the exemplary computing device 200. However, it should be appreciated that the method 500 is not limited to the system 100, the payment device 112, or the computing device 200, but may be implemented in a variety of different systems and/or payment devices and/or computing devices. Likewise, the systems, the payment devices, and the computing devices described herein should not be understood to be limited to the exemplary method 500, or other methods described herein.

In the method 500, and as previously described, the payment device 112 is registered to the user 110 such that there is a reference biometric (e.g., a reference fingerprint, etc.) stored therein, and the payment device 112 is enrolled with a cellular network carrier, whereby the payment device 112 is enabled to communicate as described herein via the modem 306, through a cellular network (and, potentially, also through a wireless network). In addition, in this exemplary embodiment, the payment account of the user 110 and/or the payment device 112 associated with the payment account is not enrolled for enhanced authentication.

With that said, at the outset in method 500, the user 110 selects a product to purchase from a virtual merchant location of the merchant 102 (e.g., from a website, network-based application, etc. for the merchant 102), at the communication device 114. In connection with checkout, the user 110 is prompted to enter payment account credentials from his/her payment device 112, whereby the user 110, at 502, provides the payment account credentials to the merchant, via the virtual merchant location at the communication device 114.

In response, the merchant 102, and specifically, the virtual merchant location, compiles and transmits, at 504, an authorization request for the transaction to the acquirer 104. Among other things, the authorization request includes a transaction amount for the transaction, a merchant identifier for the merchant 102, a merchant address for the merchant 102, a PAN for the user's payment account, acquirer information for the acquirer 104, etc. In addition, the authorization request includes an indicator of card-not-present, as the user 110 is not present at the merchant 102 in performing the transaction.

At 506, the acquirer 104 passes the authorization request to the payment network 106. And then, at 508, the payment network 106 passes the authorization request to the issuer 108. Upon receipt of the authorization request, the issuer 108 determines, at 510, whether or not biometric authentication was performed in connection with the initiated transaction. As the transaction is a card-not-present transaction in this example, the issuer 108 determines that no biometric authentication was performed, but also identifies the payment account as associated with a biometric-enabled and modem-enabled payment device (i.e., the payment device 112) (e.g., either directly or through the payment network 106, for example, based on the PAN for the user's payment account, etc.). In turn, the issuer 108 directs, at 512, the user 110 to perform a biometric authentication at the payment device 112 via the payment network 106 (e.g., through a biometric card server associated therewith where the biometric card server includes an identification of the communication device 114 as associated with the user's payment account and/or the user's payment device 112, etc.). This may include a direction to the user 110, via the communication device 114, as an SMS message or as a network-based application message.

Upon receipt of the authentication direction from the issuer 108, the communication device 114 displays, at 514, the direction to the user 110. The user 110, in turn, presents, at 516, a finger to the fingerprint sensor 310 of the payment device 112. The payment device 112 then captures, at 518, the user's fingerprint, via the fingerprint sensor 310, and authenticates the user 110, at 520, based on a comparison of the captured fingerprint to a reference biometric (i.e., the reference fingerprint in this example) stored in the payment device 112 (in memory 304). In turn, the payment device 112 transmits, at 522, an authentication result to the issuer 108 via the biometric card server indicative that the user 110 either was authenticated (i.e., there was a sufficient match between the user's fingerprint received at the payment device 112 and the reference fingerprint stored therein as would be understood by one skilled in the art) or was not authenticated. Upon receipt of the authentication result, the issuer 108 determines, at 524, whether to approve or decline the transaction based on the authentication result and one or more other criteria known to the issuer 108 regarding the user 110, his/her payment account, and/or the transaction, etc. It should be appreciated that the approval or decline may be further based on other aspects of the payment account and/or the transaction (e.g., fraud score, account balance, etc.).

The issuer 108 then compiles an authorization reply, at 526, in response to the authorization request for the transaction, and transmits the authorization reply to the payment network 106, at 528. The payment network 106 passes the authorization reply to the acquirer 104, at 530, which passes the authorization reply to the merchant 102, at 532. When the transaction is approved, the merchant 102 proceeds to deliver the product or service purchase by the user 110 to the user 110. If, however, the transaction is declined, the merchant 102, for example, may seek alternate forms of funding for the transactions.

It should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by one or more of: (a) capturing, by a processor of a payment card associated with a payment account, at a fingerprint sensor of the payment card, a fingerprint of a user in response to a network transaction to the payment account; (b) comparing, by the processor, the captured fingerprint to a reference fingerprint stored in memory of the payment card; (c) transmitting, by the processor, via a modem of the payment card, the authentication result to an entity associated with the payment account (e.g., at least one of an issuer of the payment account and/or a payment network associated with the payment account, etc.) for use to approve or decline the network transaction; and (d) providing, by the processor, payment account credentials for the payment account to a point-of-sale (POS) terminal in connection with the network transaction.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A payment card device associated with a payment account, the payment card device comprising:
   a card body defining a length dimension between about 15 mm and about 150 mm, a width dimension between about 15 mm and about 150 mm, and a thickness dimension between about 0.1 mm and about 1 mm;
   a fingerprint sensor disposed on the card body;
   a cellular modem disposed on the card body; and
   a processor disposed on the card body and coupled to the cellular modem and the fingerprint sensor, wherein the processor is configured, for a transaction involving the payment account, to:
   capture, via the fingerprint sensor, a fingerprint of a user associated with the payment account;
   compare the captured fingerprint to a reference fingerprint stored in memory in communication with the processor; and
   compile and transmit, via the cellular modem, an authentication result to an entity associated with the payment account in response to the user being authenticated, or not, based on the comparison of the captured fingerprint and the reference fingerprint, wherein the entity associated with the payment account is separate from a merchant involved in the transaction.

2. The payment card device of claim 1, wherein the cellular modem is integrated with the processor.

3. The payment card device of claim 2, wherein the card body defines a generally rectangular shape having a length dimension of about 85.60 mm, a width dimension of about 53.98 mm, and a thickness of about 0.76 mm.

4. The payment card device of claim 1, wherein the processor includes the memory; and
   wherein the fingerprint sensor and the processor are disposed at opposite end portions of the card body.

5. The payment card device of claim 1, wherein the processor is further configured to provide payment account credentials for the payment account, stored in the memory, to a point-of-sale (POS) terminal of the merchant.

6. The payment card device of claim 1, further comprising the memory and a power source disposed on the card body.

7. The payment card device of claim 1, wherein the processor is configured to transmit the authentication result to the entity via a telecommunication network.

8. The payment card device of claim 7, wherein the entity includes at least one of an issuer of the payment account and/or a payment network associated with the payment account.

9. A computer-implemented method for authenticating a user in connection with a network transaction by the user, the computer-implemented method comprising:

capturing, by a processor of a payment card associated with a payment account, at a fingerprint sensor of the payment card, a fingerprint of a user in response to a network transaction to the payment account;

comparing, by the processor, the captured fingerprint to a reference fingerprint stored in memory of the payment card;

compiling, by the processor, an authentication result for the user based on the comparison of the captured fingerprint and the reference fingerprint; and transmitting, by the processor, via a cellular modem of the payment card, the authentication result to an entity associated with the payment account for use to approve or decline the network transaction, the entity being different from a merchant involved in the transaction.

10. The computer-implemented method of claim 9, further comprising providing, by the processor, payment account credentials for the payment account to a point-of-sale (POS) terminal of the merchant in connection with the network transaction.

11. The computer-implemented method of claim 9, wherein the payment card defines a generally rectangular shape having a length dimension between about 15 mm and about 150 mm, a width dimension between about 15 mm and about 150 mm, and a thickness between about 0.1 mm and about 1 mm.

12. The computer-implemented method of claim 9, further comprising powering the payment card by a power source disposed on a body of the payment card.

13. The computer-implemented method of claim 12, wherein transmitting the authentication result further includes transmitting the authentication result to the entity associated with the payment account via a cellular network carrier through which the payment card is enrolled.

14. The computer-implemented method of claim 9, further comprising receiving, at a communication device associated with the user, an instruction for the user to provide the fingerprint to the fingerprint sensor of the payment card, in response to a network transaction to the payment account; and wherein capturing the fingerprint includes capturing the fingerprint at the fingerprint sensor of the payment card in response to the instruction received at the communication device.

15. A system for authenticating a user in connection with a network transaction by the user, the system comprising an issuer computing device coupled to a payment network, the issuer computing device configured to:

receive a request from a payment network computing device in connection with a network transaction at a merchant, the network transaction directed to a payment account of a user;

determine, in response to the request, that a payment card associated with the payment account is enabled for biometric authentication;

in response to a determination that the payment card is enabled for biometric authentication, transmit an instruction to a communication device associated with the user directing the user to provide a fingerprint to a fingerprint sensor of the payment card in order to continue with the network transaction; and receive, from the payment card, via a cellular modem of the payment card, an authentication result for the user based on a comparison of the fingerprint provided to the fingerprint sensor of the payment card and a reference fingerprint stored in memory of the payment card.

16. The system of claim 15, wherein the request includes an authentication request from a directory server of the payment network; and wherein the issuer computing device is further configured to:

generate an authentication reply in response to the authentication request, the authentication reply based at least in part on the authentication result received from the payment card; and transmit the authentication reply to the merchant, whereby the merchant includes at least part of a content of the authentication reply in an authorization request for the network transaction.

17. The system of claim 16, wherein the issuer computing device is further configured to:

receive the authorization request for the network transaction from the merchant;

generate an authorization reply in response to the authorization request, the authorization reply including either an approval or a decline of the network transaction; and transmit the authorization reply to the merchant.

18. The system of claim 15, wherein the request includes an authorization request for the network transaction generated by the merchant; and wherein the issuer computing device is configured, in response to the authentication result from the payment card, to:

generate an authorization reply in response to the authorization request, the authorization reply including either an approval or a decline of the network transaction based at least in part on the authentication result received from the payment card; and transmit the authorization reply to the merchant.

19. The system of claim 15, further comprising the payment card; and wherein the payment card includes:

a card body;

the fingerprint sensor disposed on the card body;

the cellular modem disposed on the card body; and a processor disposed on the card body and coupled to the cellular modem and the fingerprint sensor, wherein the processor is configured to:

capture, via the fingerprint sensor, the fingerprint of the user in response to the instruction directing the user to provide the fingerprint to the fingerprint sensor;

compare the captured fingerprint and the reference fingerprint stored in memory of the payment card; and compile and transmit, by the cellular modem, the authentication result for the user to the issuer computing device.

* * * * *